(12) United States Patent
Ichinose et al.

(10) Patent No.: US 9,177,727 B2
(45) Date of Patent: Nov. 3, 2015

(54) METALLIZED FILM CAPACITOR

(71) Applicant: PANASONIC CORPORATION, Osaka (JP)

(72) Inventors: Tsuyoshi Ichinose, Osaka (JP); Hiroki Takeoka, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 55 days.

(21) Appl. No.: 14/343,668

(22) PCT Filed: Oct. 24, 2012

(86) PCT No.: PCT/JP2012/006794
§ 371 (c)(1),
(2) Date: Mar. 7, 2014

(87) PCT Pub. No.: WO2013/073110
PCT Pub. Date: May 23, 2013

(65) Prior Publication Data
US 2014/0301018 A1 Oct. 9, 2014

(30) Foreign Application Priority Data

Nov. 17, 2011 (JP) ................................. 2011-251327

(51) Int. Cl.
*H01G 4/32* (2006.01)
*H01G 4/16* (2006.01)
*H01G 2/08* (2006.01)
*H01G 4/18* (2006.01)

(52) U.S. Cl.
CPC . *H01G 4/32* (2013.01); *H01G 2/08* (2013.01); *H01G 4/18* (2013.01)

(58) Field of Classification Search
USPC .................. 361/273, 275.1, 275.4, 301.5, 323
See application file for complete search history.

(56) References Cited

U.S. PATENT DOCUMENTS

| | | | |
|---|---|---|---|
| 4,609,969 A * | 9/1986 | Shedigian | 361/323 |
| 7,471,498 B2 * | 12/2008 | Lavene et al. | 361/274.1 |
| 2003/0043532 A1 * | 3/2003 | Noguchi et al. | 361/275.1 |
| 2003/0117763 A1 * | 6/2003 | Connolly | 361/301.5 |
| 2013/0194712 A1 * | 8/2013 | Lavene et al. | 361/274.1 |
| 2014/0022697 A1 * | 1/2014 | Ohchi | 361/301.5 |

FOREIGN PATENT DOCUMENTS

| | | |
|---|---|---|
| JP | 2007-088366 A | 4/2007 |
| JP | 2008-211128 A | 9/2008 |
| JP | 2010-093060 A | 4/2010 |

OTHER PUBLICATIONS

International Search Report issued in International Application No. PCT/JP2012/006794 mailed Dec. 18, 2012, with English translation, 2 pgs.

* cited by examiner

*Primary Examiner* — Eric Thomas
(74) *Attorney, Agent, or Firm* — McDermott Will & Emery LLP

(57) ABSTRACT

A metallized film capacitor includes first and second winding cores disposed along a center axis, and a capacitor element wound about the center axis around the first and the second winding cores. The second winding core is apart from the first winding core. The first and second winding cores have a thermal conductivity larger than that of the dielectric film of the capacitor element. Length $L_d$ of the capacitor element in a direction of the center axis, length $L_1$ of the first winding core inside the capacitor element in the direction of the center axis, and length $L_2$ of the second winding core inside the capacitor element in the direction of the center axis satisfy the relations of $L_1 > L_2$, $L_1 + L_2 < L_d$, $L_1 \geq L_d/2$, and $L_2 \geq (L_d - L_1)/2$. The metallized film capacitor provides the capacitor element with improved heat dissipation performance.

4 Claims, 5 Drawing Sheets

METALLIZED FILM CAPACITOR

RELATED APPLICATIONS

This application is the U.S. National Phase under 35 U.S.C. §371 of International Application No. PCT/JP2012/006794, filed on Oct. 24, 2012, which in turn claims the benefit of Japanese Application No. 2011-251327, filed on Nov. 17, 2011, the disclosures of which are incorporated by reference herein.

TECHNICAL FIELD

The present invention relates to a metallized film capacitor which is used for, e.g. electronic equipment, electric equipment, industrial equipment, and cars.

BACKGROUND ART

In recent years, from the viewpoint of environmental protection, various electric devices have generally been controlled by inverter circuits for promoting energy saving and highly efficient operation. Particularly, in car industries, since hybrid electric vehicles (hereinafter, referred to as HEVs) that run with an electric motor and an engine appeared on the market, car manufacturers have been promoting environment-friendly technology development focused on energy saving and high efficiency.

Since an electric motor for HEVs operates in a high service voltage range, such as several hundred volts, manufacturers focus on a capacitor having preferable electric characteristics, such as high withstand voltage and low loss, as being suitable for the HEV motor. Besides, in response to demands of the market on maintenance-free components, the use of the metallized film capacitor is increasing because of its extremely long life.

A metallized film capacitor used for HEVs is used for smoothing an AC component of DC power supply. In that case, an AC ripple current flowing in a DC power supply increases heat generated in the capacitor, so that heating margins of the capacitor decreases. Therefore, a metallized film capacitor with high heat-dissipation performance has been demanded.

FIGS. 4A to 4C are schematic views of metallized film capacitor 1. Metallized film capacitor 1 includes winding cores 2 and 3 made of aluminum and capacitor element 4 including a metallized film wound around winding cores 2 and 3. Winding cores 2 and 3 are apart from each other at the center of the capacitor to obtain electrical isolation between positive and negative electrodes of winding cores 2 and 3. Outer ends of winding cores 2 and 3 are connected to sprayed-metal electrode 5 (the positive electrode) and sprayed-metal electrode 6 (the negative electrode), respectively. Sprayed-metal electrodes 5 and 6 are connected to a bus bar to be drawn to the outside. Winding cores 2 and 3 are made of aluminum and therefore provide relatively high heat conduction. Generated heat is transferred to the bus bar via sprayed-metal electrodes 5 and 6 and further led to the outside, so that heat generation in capacitor element 4 is suppressed.

Patent literature 1 describes a conventional capacitor similar to metallized film capacitor 1.

In metallized film capacitor 1, heat generated in capacitor element 4 cannot be dissipated sufficiently through winding cores 2 and 3.

CITATION LIST

Patent Literature

Patent Literature 1: Japanese Patent Laid-Open Publication No. 2008-211128

SUMMARY

The metallized film capacitor has first and second winding cores disposed along a center axis, and a capacitor element wound about the center axis around the first and the second winding cores. The second winding core is apart from the first winding core. The capacitor element includes a dielectric film, a first electrode film disposed on the dielectric film, and a second electrode film facing the first electrode film via the dielectric film. The first and second winding cores have a thermal conductivity larger than that of the dielectric film. The length ($L_d$) of the capacitor element in a direction of the center axis, the length ($L_1$) of the first winding core inside the capacitor element in the direction of the center axis, and the length ($L_2$) of the second winding core inside the capacitor element in the direction of the center axis satisfy the following relations: $L_1 > L_2$, $L_1 + L_2 < L_d$, $L_1 \geq L_d/2$, $L_2 \geq (Ld - L1)/2$.

The metallized film capacitor improves a heat dissipation performance of the capacitor element.

DETAIL DESCRIPTION OF PREFERRED EMBODIMENT

Figure 1A:
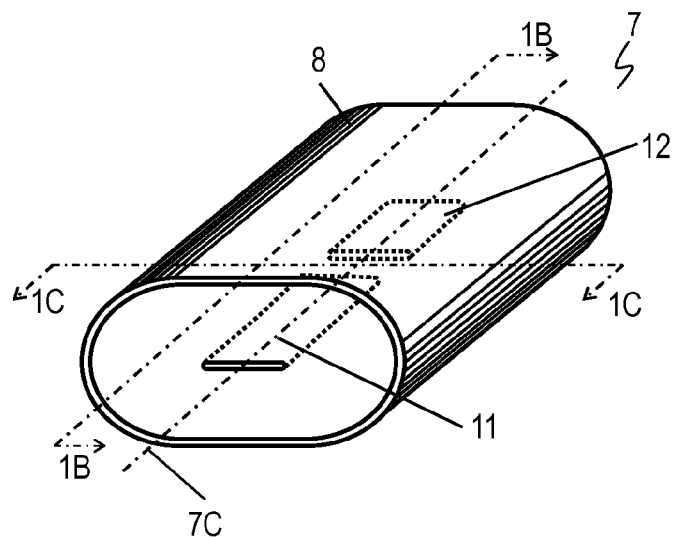
FIG. 1A is a perspective view of a metallized film capacitor in accordance with an exemplary embodiment of the present invention.
Figure 1B:
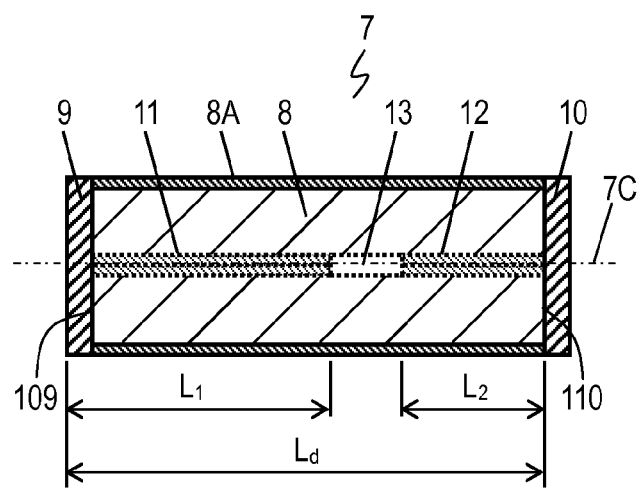
FIG. 1B is a sectional view of the metallized film capacitor at line 1B-1B shown in FIG. 1A.
Figure 1C:
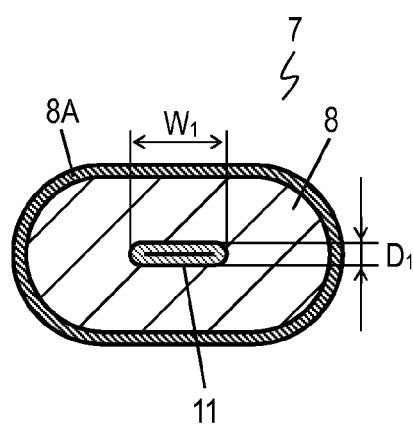
FIG. 1C is a sectional view of the metallized film capacitor at line 1C-1C shown in FIG. 1A.

FIG. 1A is a perspective view of metallized film capacitor 7 in accordance with an exemplary embodiment of the present invention. FIG. 1B is a sectional view of metallized film capacitor 7 at lime 1B-1B shown in FIG. 1A. FIG. 1C is a sectional view of metallized film capacitor 7 at line 1C-1C shown in FIG. 1A. Metallized film capacitor 7 includes capacitor element 8, edge-surface electrodes 9 and 10 of capacitor element 8 disposed on edge surfaces 109 and 110, respectively, and winding cores 11 and 12 inserted in capacitor element 8 along center axis 7C. According to the embodiment, edge-surface electrodes 9 and 10 are sprayed-metal electrodes.

Figure 1D:
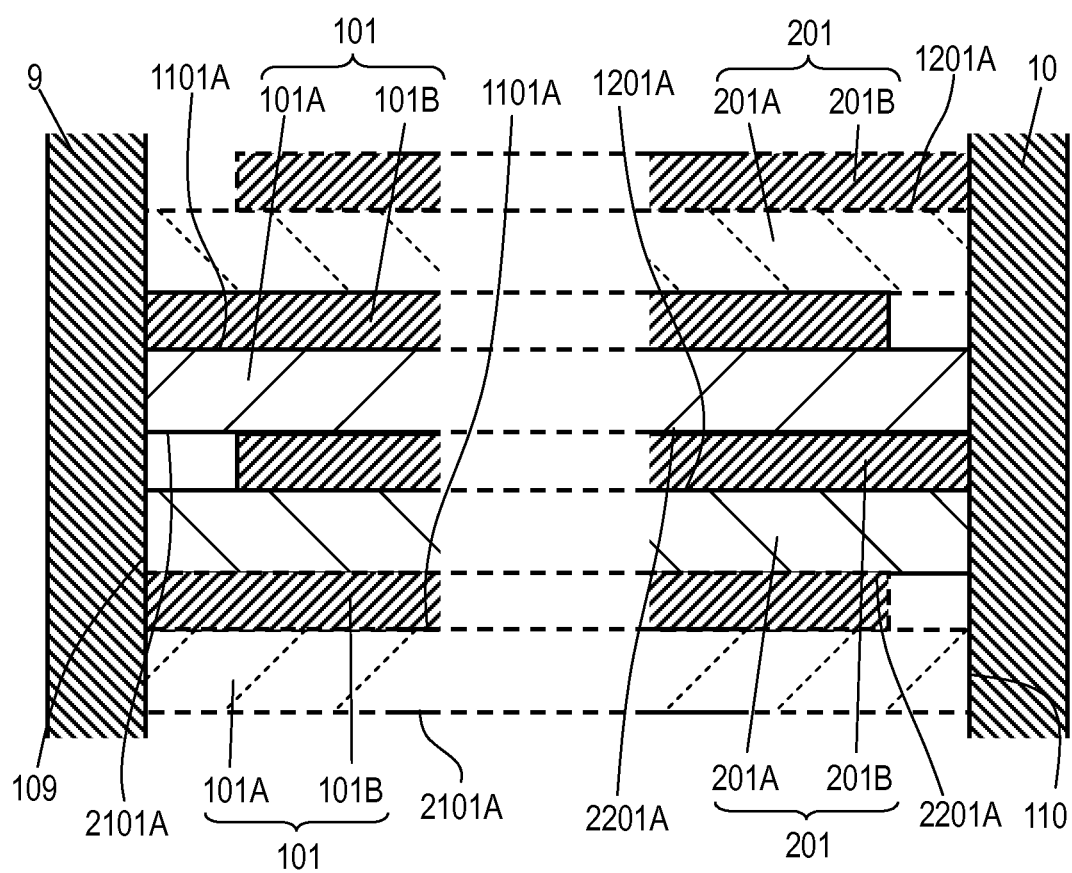
FIG. 1D is an enlarged sectional view of the metallized film capacitor shown in FIG. 1B.

FIG. 1D is an enlarged sectional view of metallized film capacitor 7 shown in FIG. 1B. Capacitor element 8 includes metallized films 101 and 201 stacked on each other. Metallized film 101 includes dielectric film 101A and electrode film 101B disposed on surface 1101A of dielectric film 101A. Metallized film 201 includes dielectric film 201A and electrode film 201B disposed on surface 1201A of dielectric film 201A. Metallized film 101 and metallized film 201 are stacked on one another such that electrode film 101B (201B) faces electrode film 201B (101B) across dielectric film 101A (201A). Metallized films 101 and 201 are wound about center core 7C on winding cores 11 and 12. Edge surfaces 109 and 110 are opposite to each other in a direction of center axis 7C.

According to the embodiment, winding cores 11 and 12 are disposed on surface 2101A (2201A) opposite to surface 1101A (1201A) of metallized film 101 (201) having electrode film 101B (201B) of dielectric film 101A (201A) provided thereon. Winding cores 11 and 12 are arranged with space 13 between winding cores 11 and 12 along center axis 7C as to be electrically disconnected. The outer ends of winding cores 11 and 12 extend to edge surfaces 109 and 110 of capacitor element 8, and connected to edge-surface electrodes 9 and 10, respectively. In the direction of center axis 7C, the length $L_1$ of winding core 11, the length $L_2$ of winding core 12 satisfy the relations of $L_1 > L_{12}$, and $L_1 + L_2 < Ld$.

Edge-surface electrodes 9 and 10 have a large surface area and are made of a material with high thermal conductivity. Winding cores 11 and 12 connected to edge-surface electrodes 9 and 10, respectively, to enhance heat dissipation of capacitor element 8.

The periphery of capacitor element 8 is covered with outer cover 8A of insulating material made of thermoplastic resin, such as polypropylene, polyethylene terephthalate, polyethylene naphthalate, or polyphenylene sulfide.

Dielectric films 101A and 201A are made of insulating material of thermoplastic resin, such as polypropylene, polyethylene terephthalate, polyethylene naphthalate, and polyphenylene sulfide. Electrode films 101B and 201B are formed by vapor-depositing a metallic material, such as aluminum, zinc, and magnesium, on surface 1101A of dielectric film 101A and surface 1201A of dielectric film 201A, respectively.

Winding cores 11 and 12 extend along center axis 7C. Winding cores 11 and 12 do not contact each other to provide predetermined space 13 between winding cores 11 and 12. According to the embodiment, the length of space 13 in the direction of center axis 7C is 20 mm. The length of space 13 is not limited to the aforementioned value, as long as isolation between the positive electrode and the negative electrode is established. Space 13 may be a void space. Further, an insulating member, such as a resin, a rubber, or a ceramic, may be inserted in space 13.

Figure 2A:
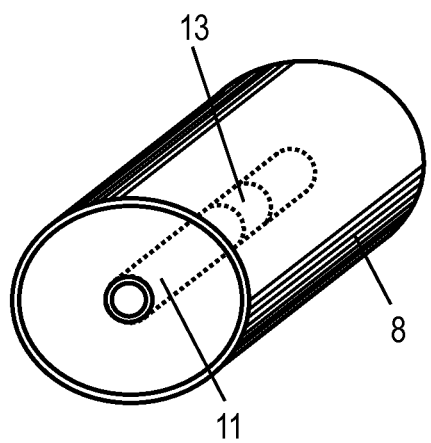
FIG. 2A is a perspective view of the metallized film capacitor in accordance with the embodiment for illustrating a method of manufacturing the metallized film capacitor.
Figure 2B:
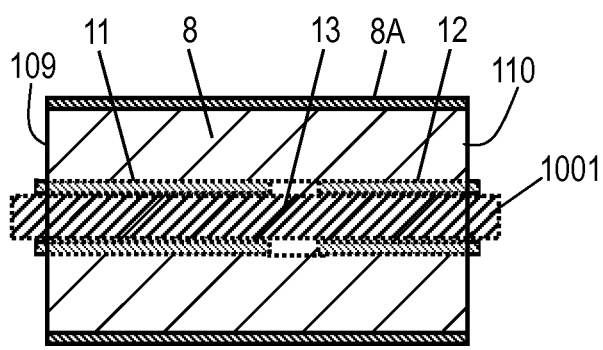
FIG. 2B is a sectional view of the metallized film capacitor shown in FIG. 2A.
Figure 2C:
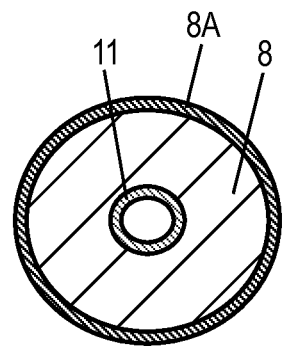
FIG. 2C is a sectional view of the metallized film capacitor shown in FIG. 2A.

FIG. 2A is a perspective view of metallized film capacitor 7 for illustrating a method of manufacturing metallized film capacitor 7. FIGS. 2B and 2C are sectional views of metallized film capacitor 7 shown in FIG. 2A. Foil made of aluminum or copper having a thickness of about 10 µm is wound about shaft 1001 of a roll-up apparatus by five turns to provide winding cores 11 and 12. Winding cores 11 and 12 may be made of metallic foil other than the above material. Further, winding cores 11 and 12 may be made of a film of organic material of an inorganic material instead of metal. In that case, the material preferably has a thermal conductivity higher than dielectric films 101A and 201A. As described above, when winding cores 11 and 12 are formed by winding foil, the foil is preferably a flexible material with a thickness ranging from several micrometers to 100 micrometers. Further, winding cores 11 and 12 may be made of a tubular body having a thickness or a bar body, instead of foil wound.

After metallized films 101 and 201 are wound around winding cores 11 and 12, winding cores 11 and 12 are removed from shaft 1001 of the roll-up apparatus, thus providing capacitor element 8 having a circular columnar shape shown in FIGS. 2A to 2C.

According to the embodiment, the outer ends of winding cores 11 and 12 protrude from edge faces 109 and 110 of capacitor element 8 by 0.5 mm, respectively. Edge-surface electrodes 9 and 10 are formed such that metallic material, such as aluminum, zinc, and magnesium, is applied onto edge surfaces 109 and 110 of capacitor element 8 by thermal spray. The outer ends of winding cores 11 and 12 protruding from capacitor element 8 enhance connection reliability between winding cores 11 and edge-surface electrode 9 and between winding core 12 and edge-surface electrode 10, facilitating heat dissipation.

When a ripple current flows into capacitor element 8, heat generated in capacitor element 8 increases a temperature in capacitor element 8. The above structure in which winding cores 11 and 12 having high thermal conductivity are connected to edge-surface electrodes 9 and 10, respectively, allows winding cores 11 and 12 to function as a heat pipe and dissipate the heat outside capacitor element 8 via edge-surface electrodes 9 and 10. According to the embodiment, capacitor element 8 having the circular columnar shape shown in FIGS. 2A to 2C is pressed to be flattened to have an oval section, as shown in FIGS. 1A to 1C). In a section perpendicular to center axis 7C of winding cores 11 and 12 after the flattening, width $W_1$ is 12 mm and thickness $D_1$ is 0.1 mm. The volume of capacitor element 8 after the flattening is about 167 cm$^3$.

The flattening of capacitor element 8 decreases spaces which are produced between plural capacitor elements 8 arranged, and reducing the size of an electronic component. Winding cores 11 and 12 according to the embodiment are made of foil, and thus, has a mechanical strength not as high as that of a thick plate or a bar. Therefore, winding cores 11 and 12 are easily formed into a flattened shape and hardly return to their original circular shape once being flattened. This eliminates an air gap and improves heat dissipation and stability.

Figure 3:
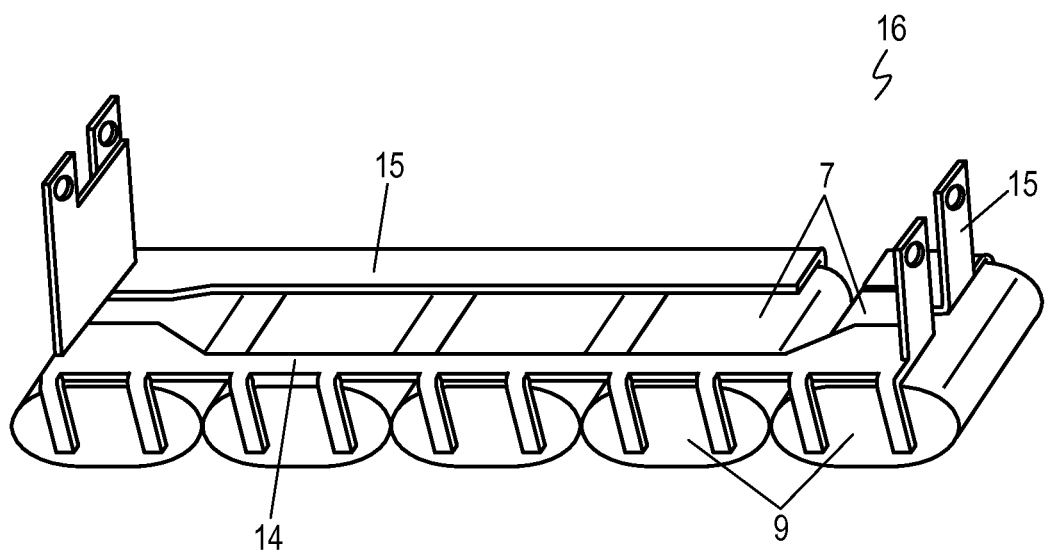
FIG. 3 is a perspective view of a capacitor unit including the metallized film capacitor in accordance with the embodiment.

FIG. 3 is a perspective view of capacitor unit 16 employing metallized film capacitor 7. In capacitor unit 16, plural metallized film capacitors 7 are arranged. Each of edge-surface electrodes 9 of metallized film capacitors 7 is connected to bus bar 14, and each of edge-surface electrodes 10 of the capacitors are connected to bus bar 15. According to the embodiment, winding cores 11 and 12 are connected to edge-surface electrodes 9 and 10, respectively. At least any one of winding cores 11 and 12 may be directly connected to bus bar 14 or bus bar 15. Bus bars 14 and 15 have a large surface area and high thermal conductivity, enhancing heat dissipation of capacitor element 8.

At least any one of winding cores 11 and 12 may be directly connected to the metallic case accommodating capacitor element 8 therein. The case has a large surface area and high thermal conductivity, and enhances heat dissipation of capacitor element 8.

Figure 4A:
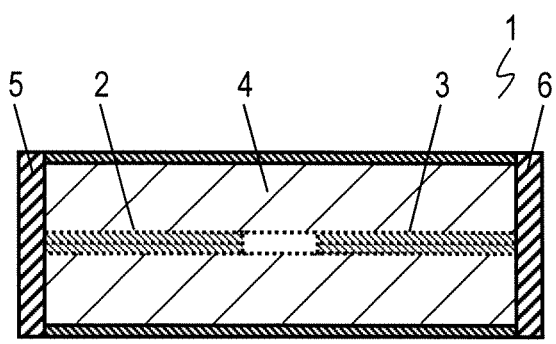
FIG. 4A is a schematic view of a conventional metallized film capacitor.
Figure 4B:
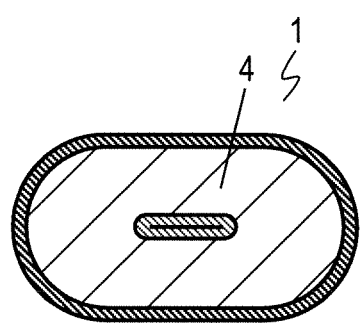
FIG. 4B is a schematic view of the conventional metallized film capacitor.
Figure 4C:
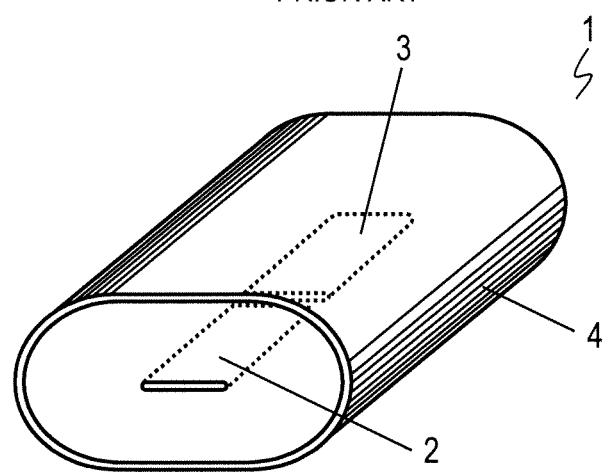
FIG. 4C is a schematic view of the conventional metallized film capacitor.

In conventional metallized film capacitor 1 shown in FIGS. 4A to 4C, winding cores 2 and 3 are separated from each other at the center of capacitor element 4. Therefore, effective heat dissipation cannot be expected in the center part of capacitor element 4 where generated heat tends to stay. That is, winding cores 2 and 3 cannot sufficiently dissipate heat of capacitor element 4.

To evaluate heat dissipation performance of capacitor element 8, samples of Examples 1 to 8 made of difference materials and different values of lengths $L_1$ and $L_2$ of winding cores 11 and 12. Table 1 shows an evaluation result of heat dissipation of metallized film capacitor 7. Winding cores 11 and 12 were made of aluminum (Al) and copper (Cu). Lengths L1 and $L_2$ represent each length of winding cores 11 and 12, respectively, inside capacitor element 8. That is, when winding cores 11 and 12 protrude from the both ends of capacitor element 8, lengths $L_1$ and $L_2$ represent lengths of portions excluding the protruding portions of winding cores 11 and 12. In the case that cores 11 and 12 do not have protruding portions, lengths $L_1$ and $L_2$ represent lengths of winding cores 11 and 12 per se.

According to the embodiment, the distance between edge-surface electrodes 9 and 10 is represented by length $L_d$ in the direction of center axis 7C of capacitor element 8. Throughout the samples, length $L_d$ was 100 mm, and the length of space 13 in the direction of center axis 7C was 20 mm. In Table 1, the thermal conductivity in space 13 was 0.05 W/m·K. Copper plates were used as bus bars 14 and 15 and connected to edge-surface electrode 9 and winding cores 11 and 12.

In Table 1, the situation that lengths $L_1$ and $L_2$ satisfy formulae F1, F2, and F3 shown below is denoted by "Yes" while lengths $L_1$ and $L_2$ do not satisfy formulae F1, F2, and F3 is denoted by "No".

$$L_1 \geq L_d/2 \quad \text{(Formula F1)}$$

$$L_2 \geq (L_d - L_1)/2 \quad \text{(Formula F2)}$$

$$L_2 > L_d/5 \quad \text{(Formula F3)}$$

As comparative examples, a sample of a capacitor element was fabricated. In the samples, winding cores 11 and 12 were separated at the center of the element and winding cores 11 and 12 have the same length satisfying $L_1=L_2$. The heat dissipation performance was evaluated by comparing to the comparative examples in a temperature rise of each sample due to ripple current (7.5 KHz and 17 Arms). That is, in the comparative examples and Examples 1 to 8, based on a temperature rise $T_0$ of the comparative example due to the ripple current and a temperature rise T of each of Examples 1 to 8 due to the ripple current, value $\Delta T = T_0 - T$ was calculated. The calculated values are shown as $\Delta T/T_0$ (%) in Table 1. The larger the value is, the higher the heat dissipation performance comparing to the comparative example.

TABLE 1

| | Material of Cores 11 and 12 | Length $L_1$ (mm) | Length $L_2$ (mm) | $\Delta T/T_0$ (%) | F1 | F2 | F3 |
|---|---|---|---|---|---|---|---|
| Example 1 | Al | 80 | 0 | −10 | Yes | No | No |
| Example 2 | Al | 70 | 10 | −5 | Yes | No | No |
| Example 3 | Al | 60 | 20 | 5 | Yes | Yes | No |
| Example 4 | Al | 50 | 30 | 12 | Yes | Yes | Yes |
| Comparative Example 1 | Al | 40 | 40 | 0 | No | Yes | Yes |
| Example 4 | Cu | 80 | 0 | −5 | Yes | No | No |
| Example 6 | Cu | 70 | 10 | 1 | Yes | No | No |
| Example 7 | Cu | 60 | 20 | 9 | Yes | Yes | No |
| Example 8 | Cu | 50 | 30 | 14 | Yes | Yes | Yes |
| Comparative Example 2 | Cu | 40 | 40 | 0 | No | Yes | Yes |

As shown in Table 1, samples satisfying at least formulae F1 and F2 have heat dissipation performance higher than the comparative examples.

That is, in a structure satisfying formula F1, winding core 11 longer than winding core 12 reaches at least the center of capacitor element 8. Therefore, winding core 11 dissipates heat to an outside from a region where a large amount of heat tends to stay.

In a structure further satisfying formula F2, shorter winding core 12 reaches the center of a part wherein winding core 11 does not exists in the space along center axis 7C of capacitor element 8.

In the structure where only winding core 11 is inserted in capacitor element 8 in the direction along center axis 7C, a lot of heat stays in the part of the space where winding core 11 does not exist along center axis 7C of capacitor element 8. On the other hand, heat at both ends of the part where winding core 11 does not exist is dissipated to the outside of capacitor element 8 from winding core 11 and edge surface 110 of capacitor element 8. That is, the region retaining a lot of heat in the part where winding core 11 does not exist is the center of the part where winding core 11 does not exists in the direction along center axis 7C. That is, the structure in which winding core 12 reaches the center of the part where winding core 11 does not exist, which satisfies formula F2, dissipates heat to the outside from the part retaining the most heat out of the region where winding core 11 does not exist. The region retaining a lot of heat is a region having a center of the highest temperature and a vicinity of the center of the part where winding core 11 does not exist having a temperature different from the highest temperature by a difference not smaller than 1° C.

Capacitor element 8 in which winding core 11 made of aluminum was inserted in center axis 7C was fabricated to find the location of the above region. It was confirmed that the region retaining a lot of heat, as described above, was formed at the center of the part where winding core 11 did not exist. Further, in the case winding core 11 was made of material, such as copper, having a thermal conductivity higher than aluminum, it was confirmed that the region retaining a lot of heat moved toward edge surface 110 of capacitor element 8. That is, in the case that winding core 11 is made of material with a thermal conductivity higher than 236 W/m·K of aluminum, if the structure satisfies formula F2, winding core 12 reaches the region retaining a lot of heat in the part where winding core 11 does not exist. As a result, this structure efficiently dissipates the heat retained along the center axis of capacitor element 8.

Further, a structure satisfying formula F3 enables length $L_2$ of winding core 12 to be longer, enhancing heat dissipation. Shorter winding core 12 may be longer than 20% of length $L_d$ of capacitor element 8. This structure enhances heat dissipation with use of bus bars 14 and 15 connected to edge-surface electrodes 9 and 10.

The temperature of a capacitor element which includes none of winding cores 11 and 12 became higher than that of the comparative examples by 6.8° C. Inserted winding cores 11 and 12 contribute to enhancing heat dissipation. Winding cores 11 and 12 and the above structure improve heat dissipation of metallized film capacitor 7 according to the embodiment.

INDUSTRIAL APPLICABILITY

A metallized film capacitor according to the present invention has excellent heat dissipation, and is useful for the automotive field in which components operate sufficiently under a harsh operating environment, such as high temperature and high pressure.

REFERENCE MARKS IN THE DRAWINGS

7 Metallized Film Capacitor
7C Center Axis
8 Capacitor Element
11 Winding Core (First Winding Core)
12 Winding Core (Second Winding Core)
13 Space
101A Dielectric Film
101B Electrode Film (First Electrode Film)
109 Edge Surface (First Edge Surface)
110 Edge Surface (Second Edge Surface)
201A Dielectric Film
201B Electrode Film (Second Electrode Film)

The invention claimed is:

1. A metallized film capacitor comprising:
   a first winding core arranged along a center axis;
   a second winding core arranged along the center axis and apart from the first winding core; and
   a capacitor element wound about the center axis around the first winding core and the second winding core, the capacitor element including
   a dielectric film,
   a first electrode film disposed on the dielectric film, and
   a second electrode film facing the first electrode film across the dielectric film,
   wherein, the first winding core and the second winding core have a thermal conductivity larger than a thermal conductivity of the dielectric film, and
   wherein a length $L_d$ of the capacitor element in a direction of the center axis, a length $L_1$ of the first winding core inside the capacitor element in the direction of the center axis, and a length $L_2$ of the second winding core inside the capacitor element in the direction of the center axis satisfy relations of $L_1 > L_2$, $L_1 + L_2 < L_d$, $L_1 \geq L_d/2$, and $L_2 \geq (L_d - L_1)/2$.

2. The metallized film capacitor according to claim 1, wherein the length $L_2$ of the second winding core satisfies a relation of $L_2 > L_d/5$.

3. The metallized film capacitor according to claim 2,
   wherein the capacitor element has a first edge surface and a second edge surface opposite to each other along the center axis, and
   wherein the first winding core and the second winding core reach the first edge surface and the second edge surface, respectively.

4. The metallized film capacitor according to claim 1,
   wherein the capacitor element has a first edge surface and a second edge surface opposite to each other along the center axis, and
   wherein the first winding core and the second winding core reach the first edge surface and the second edge surface, respectively.

* * * * *